United States Patent [19]
McDowell

[11] Patent Number: 6,083,106
[45] Date of Patent: Jul. 4, 2000

[54] VIDEO GAME RACE CAR SIMULATOR ASSEMBLY

[76] Inventor: Brian R. McDowell, 572 Greenwood Dr., Vacaville, Calif. 95687

[21] Appl. No.: 09/146,564

[22] Filed: Sep. 3, 1998

[51] Int. Cl.[7] ................................. A63F 9/22; G09B 9/04
[52] U.S. Cl. .................................. 463/46; 463/36; 463/6; 434/62
[58] Field of Search ..................... 463/36, 38, 6, 463/46; 434/62, 71, 29; 472/1, 130

[56] References Cited

U.S. PATENT DOCUMENTS

| | | | |
|---|---|---|---|
| 3,936,955 | 2/1976 | Gruen et al. ............................ | 434/63 |
| 4,276,030 | 6/1981 | Radice .................................... | 434/62 |
| 4,949,119 | 8/1990 | Moncrief et al. ................. | 395/500.29 |
| 4,952,152 | 8/1990 | Briggs et al. ........................... | 434/69 |
| 5,015,189 | 5/1991 | Wenzinger, Jr. ....................... | 434/63 |
| 5,766,079 | 6/1998 | Kataoka et al. ....................... | 463/36 |
| 5,885,080 | 3/1999 | Letovsky ................................ | 434/62 |
| 5,951,018 | 9/1999 | Mamitsu ................................ | 273/442 |

*Primary Examiner*—Jessica J. Harrison
*Assistant Examiner*—Corbett B. Coburn, III

[57] ABSTRACT

A video game race car simulator assembly for simulating the sitting in the driver seat of a racing car when playing video game racing car simulations. The assembly includes a base frame with a seat mounted thereto. A spaced apart pair of elongate arm members are pivotally coupled to the front end member of the base frame and upwardly extend from the base frame. A crossbar connects the upper ends of the arm members and a steering wheel input device is mounted to the crossbar. Each of the side members of the base frame has a telescopically extendable elongate support brace upwardly extending therefrom. Each of the arm members has a tubular collar disposed therearound. Each of the collars is coupled to the top end of an adjacent support brace. A stick shift input device is pivotally coupled to one of the side members. A pair of foot pedal input devices are mounted to the front end member of the base frame.

7 Claims, 2 Drawing Sheets

VIDEO GAME RACE CAR SIMULATOR ASSEMBLY

BACKGROUND OF THE INVENTION

1. Field of the Invention

The present invention relates to video game race car simulator assemblies and more particularly pertains to a new video game race car simulator assembly for simulating the sitting in the driver seat of a racing car when playing video game racing car simulations.

2. Description of the Prior Art

The use of video game race car simulator assemblies is known in the prior art. More specifically, video game race car simulator assemblies heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,936,955; U.S. Pat. No. 3,171,215; U.S. Pat. No. Des. 318,073; U.S. Pat. No. 4,711,447; U.S. Pat. No. 5,044,956; and U.S. Pat. No. 3,193,946.

While these devices fulfill their respective, particular objectives and requirements, the aforementioned patents do not disclose a new video game race car simulator assembly. The inventive device includes a base frame with a seat mounted thereto. A spaced apart pair of elongate arm members are pivotally coupled to the front end member of the base frame and upwardly extend from the base frame. A crossbar connects the upper ends of the arm members and a steering wheel input device is mounted to the crossbar. Each of the side members of the base frame has a telescopically extendable elongate support braces upwardly extending therefrom. Each of the arm members has a tubular collar disposed therearound. Each of the collars is coupled to the top end of an adjacent support brace. A stick shift input device is pivotally coupled to one of the side members. A pair of foot pedal input devices are mounted to the front end member of the base frame.

In these respects, the video game race car simulator assembly according to the present invention substantially departs from the conventional concepts and designs of the prior art, and in so doing provides an apparatus primarily developed for the purpose of simulating the sitting in the driver seat of a racing car when playing video game racing car simulations.

SUMMARY OF THE INVENTION

In view of the foregoing disadvantages inherent in the known types of video game race car simulator assemblies now present in the prior art, the present invention provides a new video game race car simulator assembly construction wherein the same can be utilized for simulating the sitting in the driver seat of a racing car when playing video game racing car simulations.

The general purpose of the present invention, which will be described subsequently in greater detail, is to provide a new video game race car simulator assembly apparatus and method which has many of the advantages of the video game race car simulator assemblies mentioned heretofore and many novel features that result in a new video game race car simulator assembly which is not anticipated, rendered obvious, suggested, or even implied by any of the prior art video game race car simulator assemblies, either alone or in any combination thereof.

To attain this, the present invention generally comprises a base frame with a seat mounted thereto. A spaced apart pair of elongate arm members are pivotally coupled to the front end member of the base frame and upwardly extend from the base frame. A crossbar connects the upper ends of the arm members and a steering wheel input device is mounted to the crossbar. Each of the side members of the base frame has a telescopically extendable elongate support braces upwardly extending therefrom. Each of the arm members has a tubular collar disposed therearound. Each of the collars is coupled to the top end of an adjacent support brace. A stick shift input device is pivotally coupled to one of the side members. A pair of foot pedal input devices are mounted to the front end member of the base frame.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new video game race car simulator assembly apparatus and method which has many of the advantages of the video game race car simulator assemblies mentioned heretofore and many novel features that result in a new video game race car simulator assembly which is not anticipated, rendered obvious, suggested, or even implied by any of the prior art video game race car simulator assemblies, either alone or in any combination thereof.

It is another object of the present invention to provide a new video game race car simulator assembly which may be easily and efficiently manufactured and marketed.

It is a further object of the present invention to provide a new video game race car simulator assembly which is of a durable and reliable construction.

An even further object of the present invention is to provide a new video game race car simulator assembly which is susceptible of a low cost of manufacture with regard to both materials and labor, and which accordingly is then susceptible of low prices of sale to the consuming public, thereby making such video game race car simulator assembly economically available to the buying public.

Still yet another object of the present invention is to provide a new video game race car simulator assembly which provides in the apparatuses and methods of the prior art some of the advantages thereof, while simultaneously overcoming some of the disadvantages normally associated therewith.

Still another object of the present invention is to provide a new video game race car simulator assembly for simulating the sitting in the driver seat of a racing car when playing video game racing car simulations.

Yet another object of the present invention is to provide a new video game race car simulator assembly which includes a base frame with a seat mounted thereto. A spaced apart pair of elongate arm members are pivotally coupled to the front end member of the base frame and upwardly extend from the base frame. A crossbar connects the upper ends of the arm members and a steering wheel input device is mounted to the crossbar. Each of the side members of the base frame has a telescopically extendable elongate support braces upwardly extending therefrom. Each of the arm members has a tubular collar disposed therearound. Each of the collars is coupled to the top end of an adjacent support brace. A stick shift input device is pivotally coupled to one of the side members. A pair of foot pedal input devices are mounted to the front end member of the base frame.

Still yet another object of the present invention is to provide a new video game race car simulator assembly that helps further enhance a user's experience when playing a racing car video game so that the simulation feels more real to the user.

Even still another object of the present invention is to provide a new video game race car simulator assembly that is adjustable to permit comfortable use by a variety of users having different heights so that the user does not quickly become cramped and fatigued by sitting in the assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
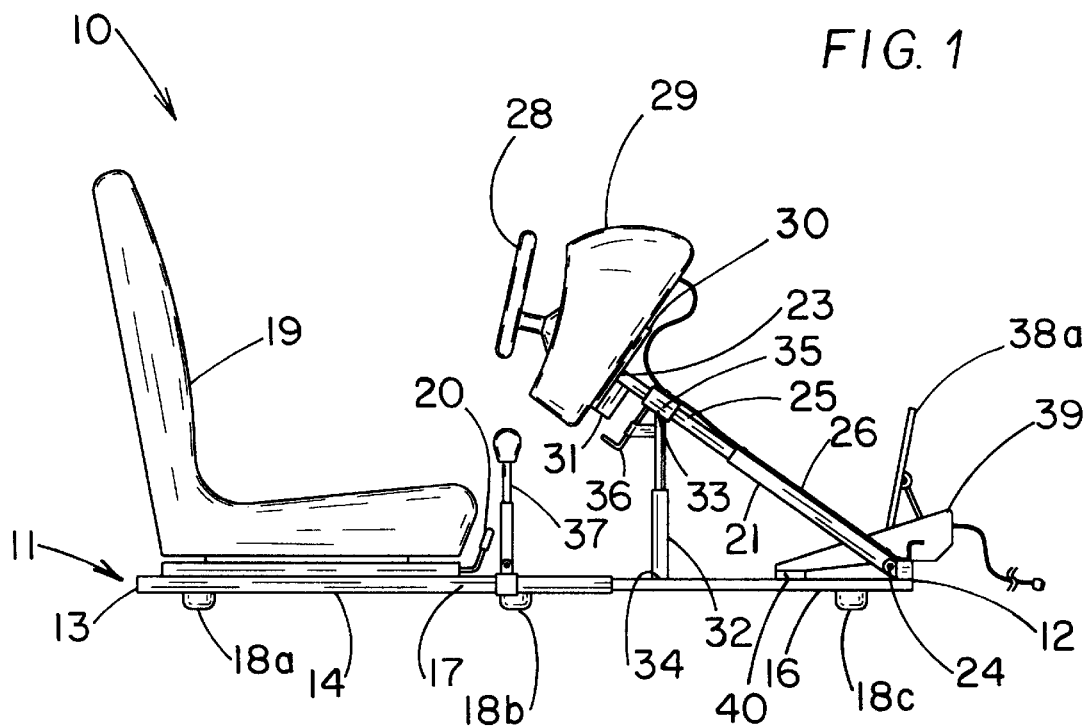
FIG. 1 is a schematic side view of a new video game race car simulator assembly according to the present invention.
Figure 2:
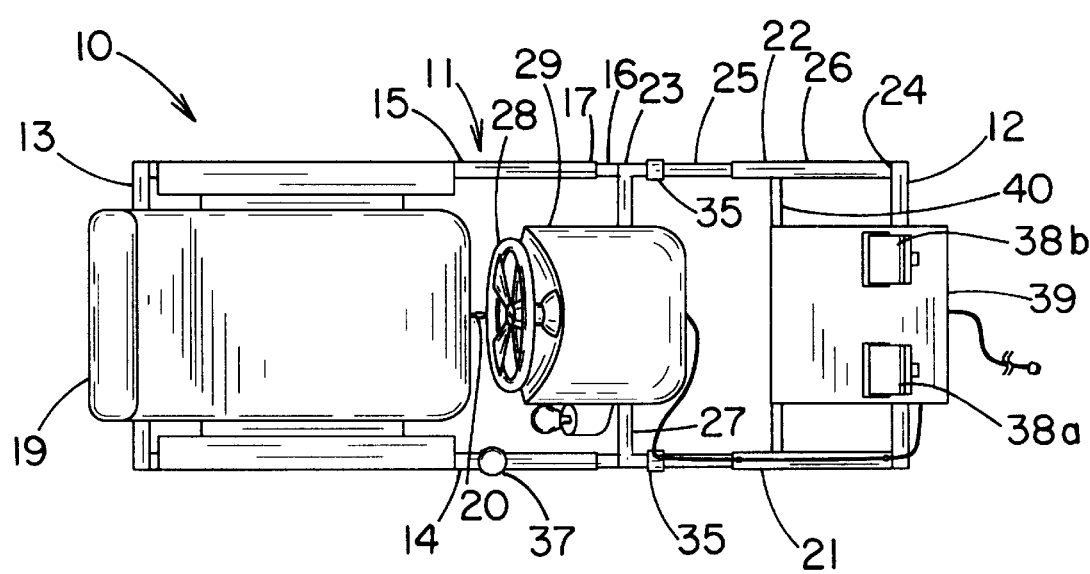
FIG. 2 is a schematic top view of the present invention.
Figure 3:
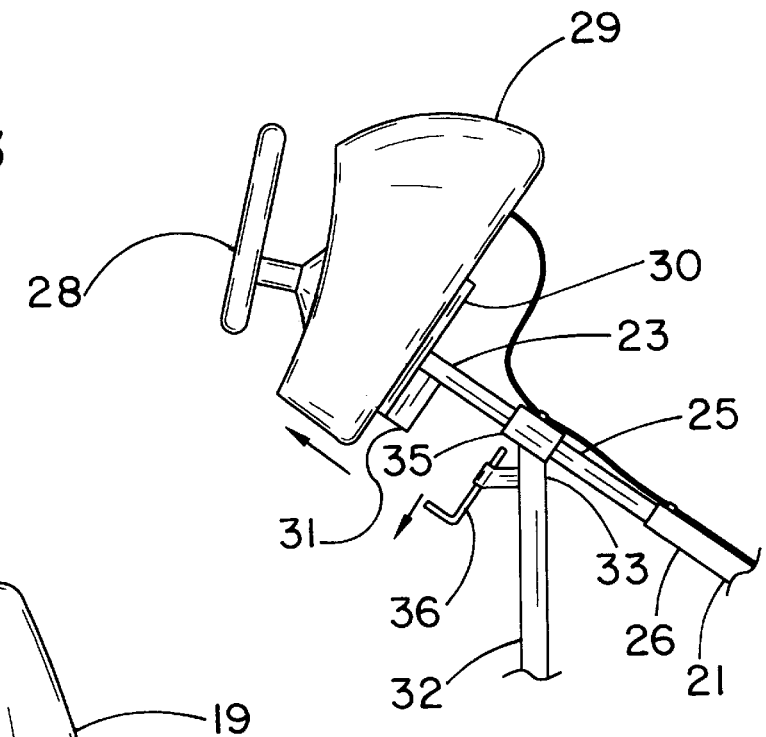
FIG. 3 is a schematic partial side view of the present invention illustrating the region around of upper ends of the arm members.
Figure 4:
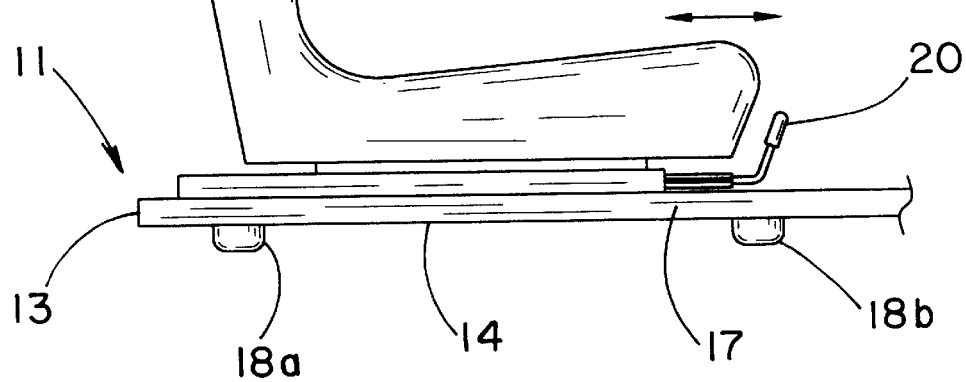
FIG. 4 is a schematic partial side view of the seat region of the present invention.

With reference now to the drawings, and in particular to FIGS. 1 through 4 thereof, a new video game race car simulator assembly embodying the principles and concepts of the present invention and generally designated by the reference numeral 10 will be described.

As best illustrated in FIGS. 1 through 4, the video game race car simulator assembly 10 generally comprises a base frame 11 with a seat 19 mounted thereto. A spaced apart pair of elongate arm members 21,22 are pivotally coupled to the front end member 12 of the base frame 11 and upwardly extend from the base frame 11. A crossbar 27 connects the upper ends 23 of the arm members 21,22 together and a steering wheel input device 28 is mounted to the crossbar 27. Each of the side members 14,15 of the base frame 11 has a telescopically extendable elongate support brace 32 upwardly extending therefrom. Each of the arm members 21,22 has a tubular collar 35 disposed therearound. Each of the collars 35 is coupled to the top end 33 of an adjacent support brace 32. A stick shift input device 37 is pivotally coupled to one of the side members 14,15. A pair of foot pedal input devices 38a,38b are mounted to the front end member 12 of the base frame 11.

In use, the video game race car simulator assembly 10 is designed for use with a racing car simulation video game having a central processor and a video display. The central processor has a plurality of outlets for receiving video game controller inputs. The assembly 10 lets a user feel more like he or she is actually in a car that the user is controlling in the video game.

In closer detail, the assembly 10 comprises a generally rectangular base frame 11 having spaced apart elongate tubular front and back end members 12,13 and a spaced apart pair of tubular side members 14,15 extending between the front and back end members 12,13. In use, the base frame 11 is designed for resting on a surface with the front end member 12 facing the video display of the racing car simulation video game. Preferably, the front and back end members 12,13 extend generally parallel to one another. The side members 14,15 preferably extend generally parallel to one another and generally perpendicular to the front and back ends members. In this preferred embodiment, the end and side members 12,13,14,15 of the base frame 11 generally lie in a common plane. The base frame 11 has a length defined between the front and back end members 12,13 and a width defined between the side members 14,15.

Preferably, each of the side members 14,15 is telescopically extendable to permit adjustment of the length of the base frame 11. In this preferred embodiment, each of the side members 14,15 has front and back telescopic portions 16,17. The front telescopic portions 16 of the side members 14,15 are located adjacent the front end member 12 and the back telescopic portions 17 of the side members 14,15 are located adjacent the back end member 13. The back telescopic portion 17 of each side member 14,15 telescopically receives the associated front telescopic portion 16 of the respective side member 14,15. In an ideal embodiment, the fully extended length of the base frame is about 48 inches and the width is about 18 inches.

The base frame 11 preferably has a plurality of downwardly depending feet 18a,18b,18c provided on each of the side members 14,15. The feet 18a,18b,18c preferably comprise friction enhancing materials such as rubber designed for preventing sliding of the base frame 11 on a surface. Ideally, each of the side members 14,15 has three feet 18a,18b,18c depending therefrom. A first foot 18c of each side member 14,15 is located towards the front end member 12, a second foot 18a of each side member 14,15 is located towards the back end member 13, and a third foot 18b of each side member 14,15 is interposed between the first and second feet 18c,18a of the respective side member 14,15 and is located on the back telescopic portion 17 of the respective side member 14,15.

A seat 19 with a back rest is slidably mounted on side members 14,15 of the base frame 11 to permit sliding of the seat 19 in a direction extending between the front and back end members 12,13 of the base frame 11. The seat 19 is designed for seating a user of the assembly thereon. The seat 19 is positioned adjacent the back end member 13 of the base frame 11 such that a user in the seat 19 faces towards the front end member 12 of the base frame 11 The seat 19 preferably includes a latching mechanism for releaseably holding the seat 19 in a fixed position on the base frame 11 between the front and back end members 12,13. The latching mechanism has an actuating lever 20 forwardly extending from the seat 19 to permit a user to selectively release the latching mechanism so that the seat 19 is free to slide to a desired position on the base frame 11.

A spaced apart pair of elongate tubular arm members 21,22 upwardly extend from the base frame 11. Each arm member 21,22 has opposite upper and lower ends 23,24. The lower ends 24 of the arm members 21,22 are pivotally coupled to the front end member 12 of the base frame 11 so that the upper ends 23 of the arm members 21,22 are extended in a direction towards the back end member 13 of the base frame 11.

Preferably, each of the arm members 21,22 is telescopically extendable to permit adjustment of the length of the arm members 21,22. In this preferred embodiment, each of the arm members 21,22 has upper and lower telescopic portions 25,26. The upper telescopic portions 25 of the arm members 21,22 are located adjacent the upper ends 23 of the arm members 21,22, and the lower telescopic portions 26 of the arm members 21,22 are located adjacent the lower ends 24 of the arm members 21,22. The lower telescopic portion 26 of each arm member 21,22 telescopically receive the associated upper telescopic portion 25 of the respective arm member 21,22.

An elongate tubular crossbar 27 extends between the upper ends 23 of the arm members 21,22 to connect the arm members 21,22 together. The arm members 21,22 are preferably extended generally parallel to one another and generally parallel to the side members 14,15 of the base frame 11. The crossbar 27 is preferably extended generally perpendicular to the arm members 21,22 and generally parallel to the front and back end members 12,13 of the base frame 11.

A steering wheel input device 28 is mounted to the crossbar 27. The steering wheel input device 28 is electrically connectable to a central processor of a racing car simulating video game. The steering wheel input device 28 has a base portion 29 and a steering wheel portion rotatably mounted to the base portion 29. The steering wheel faces in a direction towards the seat 19 so that a user in the seat can grasp the steering wheel portion. The base portion 29 is coupled to the crossbar 27. Ideally, the crossbar has a mounting plate 30 coupled thereto preferably with a pair of support tabs 31 also coupled to the mounting plate 30 and upper ends 23 of the arm members 21,22. In this ideal embodiment, the base portion 29 is coupled to the mounting plate 30. In use, the mounting plate 30 is designed for providing additional structural strength between the base portion 29 and the crossbar 27 and for providing more stability to the steering wheel input device 28 on the crossbar 27.

Each of the side members 14,15 of the base frame 11 has a telescopically extendable elongate support brace 32 upwardly extending therefrom. Each of the support braces 32 has top and bottom ends 33,34. The bottom ends 34 of the support braces 32 are coupled to the respective side member 14,15.

The upper telescopic portion 25 of each of the arm members 21,22 has a tubular collar 35 disposed therearound to permit sliding therethrough of the associated upper telescopic portion 25 of the respective arm member 21,22. Each of the collars 35 is coupled to the top end 33 of an adjacent support brace 32. Each of the support braces has a locking pin 36 slidably mounted thereto towards the top end 33 of the respective support brace. Each of the locking pins 36 is slidably insertable through a hole in the adjacent collar 35 and into one hole of a row of holes in the upper telescopic portion 25 of the adjacent arm member 21,22 to releasably hold the associated upper telescopic portion 25 in a fixed position with respect to the associated lower telescopic portion 26 of the respective arm member 21,22 and hold the arm member 21,22 in a position with respect to base frame 11.

A telescopically extendable stick shift input device 37 is pivotally coupled to one of the side members 14,15. The stick shift input device 37 is designed for electrically connecting to a central processor of a racing car simulation video game.

A pair of foot pedal input devices 38a,38b with a base 39 mounted to the front end member 12 of the base frame 11 to permit the feet of a user sitting in the seat 19 to control the foot pedal input devices 38a,38b. The foot pedal input devices 38a,38b are designed for electrically connecting to a central processor of a racing car simulation video game. Preferably, the base frame 11 has a cross member 40 extending between the side members 14,15, the base 39 of the foot pedal input devices 38a,38b is mounted on the cross member 40 for providing additional stability and structural strength to the mounting of the base of foot pedal input devices 38a,38b on the base frame 11.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A video game race car simulator assembly for use with a racing car simulation video game, said assembly comprising:

a base frame having spaced apart elongate front and back end members and a spaced apart pair of side members extending between said front and back end members;

a seat being mounted to said base frame towards said back end member of said base frame;

a spaced apart pair of elongate arm members upwardly extending from said base frame, each arm member having opposite upper and lower ends;

said lower ends of said arm members being pivotally coupled to said front end member of said base frame, said upper ends of said arm members being extended in a direction towards said back end member of said base frame;

an elongate crossbar extending between said upper ends of said arm members;

a steering wheel input device being mounted to said crossbar, said steering wheel input device being adapted for electrically connecting to a central processor of a racing car simulating video game;

each of said side members of said base frame having a telescopically extendable elongate support braces upwardly extending therefrom, each of said support braces having top and bottom ends, said bottom ends of said support braces being coupled to the respective side member;

each of said arm members having a tubular collar disposed therearound, each of said collars being coupled to the top end of an adjacent support brace;

a stick shift input device being pivotally coupled to one of said side members, said stick shift input device being adapted for electrically connecting to a central processor of a racing car simulation video game; and a pair of foot pedal input devices being mounted to said front end member of said base frame, said foot pedal input devices being adapted for electrically connecting to a central processor of a racing car simulation video game.

2. The assembly of claim 1, wherein each of said side members are telescopically extendable.

3. The assembly of claim 1, wherein said base frame has a plurality of downwardly depending feet provided on each of said side members.

4. The assembly of claim 1, wherein said seat is slidably mounted on side members of said base frame to permit sliding of said seat in a direction extending between said front and back end members of said base frame.

5. The assembly of claim 1, wherein each of said arm members are telescopically extendable.

6. The assembly of claim 1, wherein each of said support braces has a locking pin slidably mounted thereto towards said top end of the respective support brace, each of said locking pins being slidably insertable through the adjacent collar and into the adjacent arm member to releasably hold the arm member in a position with respect to base frame and said support brace.

7. A video game race car simulator assembly for use with a racing car simulation video game, said assembly comprising:

a base frame being generally rectangular in configuration and having spaced apart elongate front and back end members and a spaced apart pair of side members extending between said front and back end members;

said front and back end members extending generally parallel to one another, said side members extending generally parallel to one another and generally perpendicular to said front and back ends members;

said end and side members of said base frame generally lying in a common plane;

said base frame having a length defined between said front and back end members and a width defined between said side members;

each of said side members being telescopically extendable, each of said side members having front and back telescopic portions;

said front telescopic portions of said side members being located adjacent said front end member, said back telescopic portions of said side members being located adjacent said back end member;

said back telescopic portion of each side member telescopically receiving the associated front telescopic portion;

said base frame having a plurality of downwardly depending feet provided on each of said side members;

wherein each of said side members has three feet depending therefrom;

a first foot of each side member being located towards said front end member, a second foot of each side member being located towards said back end member, and a third foot of each side member being interposed between said first and second feet of the respective side member and being located on said back telescopic portion of the respective side member;

a seat being slidably mounted on side members of said base frame to permit sliding of said seat in a direction extending between said front and back end members of said base frame, said seat being positioned adjacent said back end member of said base frame;

said seat having a latching mechanism for releasably holding said seat in a position on said base frame between said front and back end members;

a spaced apart pair of elongate arm members upwardly extending from said base frame, each arm member having opposite upper and lower ends;

said lower ends of said arm members being pivotally coupled to said front end member of said base frame, said upper ends of said arm members being extended in a direction towards said back end member of said base frame;

each of said arm members being telescopically extendable, each of said arm members having upper and lower telescopic portions;

said upper telescopic portions of said arm members being located adjacent said upper ends of said arm members, and said lower telescopic portions of said arm members being located adjacent said lower ends of said arm members;

said lower telescopic portion of each arm member telescopically receiving the associated upper telescopic portion;

an elongate crossbar extending between said upper ends of said arm members;

said arm members being extended generally parallel to one another and generally parallel to said side members of said base frame, said crossbar being extended generally perpendicular to said arm members and generally parallel to said front and back end members of said base frame;

a steering wheel input device being mounted to said crossbar, said steering wheel input device being electrically connectable to a central processor of a racing car simulating video game;

said steering wheel input device having a base portion and a steering wheel portion rotatably mounted to said base portion, said steering wheel facing in a direction towards said seat;

said base portion being coupled to said crossbar wherein said cross bar having a mounting plate coupled thereto, wherein said base portion is coupled to said mounting plate;

each of said side members of said base frame having a telescopically extendable elongate support braces upwardly extending therefrom, each of said support braces having top and bottom ends, said bottom ends of said support braces being coupled to the respective side member;

each of said arm members having a tubular collar disposed therearound, each of said collars being coupled to the top end of an adjacent support brace;

each of said support braces having a locking pin slidably mounted thereto towards said top end of the respective side member, each of said locking pins being slidably insertable through the adjacent collar and into the upper telescopic portion of the adjacent arm member to releasably hold the associated upper telescopic portion in a position with respect to the associated lower telescopic portion of the respective arm member and hold the arm member in a position with respect to base frame;

a telescopically extendable stick shift input device being pivotally coupled to one of said side members, said stick shift input device being adapted for electrically connecting to a central processor of a racing car simulation video game;

a pair of foot pedal input devices having a base being mounted to said front end member of said base frame, said foot pedal input devices being adapted for electrically connecting to a central processor of a racing car simulation video game; and wherein said base frame has a cross member extending between said side members, said base of said foot pedal input devices being mounted on said cross member.

* * * * *